United States Patent [19]

Kuivamaki

[11] Patent Number: 5,415,253

[45] Date of Patent: May 16, 1995

[54] ELECTROMAGNETIC BRAKE WITH ROTATIONAL STRUCTURE FOR WEAR ADJUSTMENT

[75] Inventor: Ismo Kuivamaki, Vantaa, Finland

[73] Assignee: Kone OY, Helsinki, Finland

[21] Appl. No.: 253,692

[22] Filed: Jun. 3, 1994

Related U.S. Application Data

[60] Division of Ser. No. 976,007, Nov. 13, 1992, Pat. No. 5,368,138, which is a continuation of Ser. No. 668,564, Mar. 13, 1991, abandoned.

[30] Foreign Application Priority Data

Mar. 13, 1990 [FI] Finland ................................. 901247

[51] Int. Cl.⁶ ............................................ F16D 59/02
[52] U.S. Cl. .................................. 188/71.8; 188/171; 192/111 A
[58] Field of Search ................... 188/71.7, 71.8, 71.9, 188/196 R, 196 D, 196 F, 196 V, 171, 173; 192/90, 111 A

[56] References Cited

U.S. PATENT DOCUMENTS

| | | | |
|---|---|---|---|
| 2,970,681 | 2/1961 | Timmcke | 192/111 A |
| 3,575,268 | 4/1971 | Kimata | 188/71.8 X |
| 4,175,650 | 11/1979 | Miller | 192/111 A X |
| 4,582,187 | 4/1986 | Sekella | 188/71.9 X |
| 4,966,255 | 10/1990 | Fossum | 188/71.8 |
| 4,993,532 | 2/1991 | Weiss et al. | 188/71.8 X |

FOREIGN PATENT DOCUMENTS 0075653 2/1988 Finland .

*Primary Examiner*—Josie A. Ballato
*Attorney, Agent, or Firm*—Sughrue, Mion, Zinn, Macpeak & Seas

[57] ABSTRACT

An electromagnetic brake is disclosed comprising a brake wheel, at least one friction surface attached to a respective friction plate and urged into frictional engagement with the brake wheel during braking. An electromagnet and an anchor serve to disengage the friction surface from the brake wheel when a current is supplied to the electromagnet. To compensate for the wear of the friction surface, the anchor is adapted to rotate in adjustment threads and thereby advance towards the magnet. Rotation of the anchor is caused by a coil spring. To maintain an essentially constant clearance between the electromagnet and the anchor when the brake is in the close state, the brake is provided with spring-loaded lugs mounted on a face of the anchor and protruding a predetermined distance towards the electromagnet. The spring-loaded lugs are adapted to limit the movement of the anchor towards the electromagnet when the brake is closed, and are compressed to allow the brake to be disengaged when power is supplied to the electromagnet.

6 Claims, 9 Drawing Sheets

A - A

ELECTROMAGNETIC BRAKE WITH ROTATIONAL STRUCTURE FOR WEAR ADJUSTMENT

This is a divisional of application Ser. No. 07/976,007, filed Nov. 13, 1992, now U.S. Pat. No. 368,138; which in turn is a continuation of prior application Ser. No. 07/668,564, filed Mar. 13, 1991, now abandoned.

The present invention relates to an electromagnetic brake which is released by the action of the electromagnet when power is supplied to the electromagnet, and engaged when power supply to the electromagnet is cut off.

In electro magnetic disc or drum brakes, the working clearance between the electromagnet and the anchor plate (when the brake is in the closed position) tends to increase, due to the wear of the friction surfaces and the brake wheel. An increase in this working clearance leads to a decreased force of attraction between the electromagnet and the anchor plate, and consequent difficulties in releasing the brake. Another consequence of this increased working clearance is a decreased brake spring force, which results in a reduced brake torque. In addition, a large working clearance increases the speed of the anchor plate movement (thus increasing the impact force applied to the friction surfaces) when the brake is being engaged. The result of this is a high initial peak in braking torque which imposes a high stress on the brake and other structures and deteriorates the operating characteristics of the brake. Moreover, the reliability of the brake suffers due to the higher stress level, and the stresses may become uncontrollable due to insufficient servicing.

FI publication 75653 proposes an electromagnetic disc brake in which, when the brake is closed, a constant gap between the electromagnet coil and the anchor plate is maintained by means of a stepless adjusting device. This adjusting device is provided with balls running in groove tracks at that end where the electromagnet frame is located. An alternative adjusting device employs a wedge placed between the frame and the electromagnet coil. The wedge moves down-wards due to its own weight, thereby adjusting the size of the gap.

An object of the present invention is to provide an electromagnetic brake in which means is provided for improved adjustment of the working clearance.

According to the present invention, an electromagnetic brake has a brake wheel supported on a shaft, and friction surfaces fixedly secured on respective friction plates. The friction plates are forced, by urging means, into frictional engagement with the brake wheel when the electromagnetic brake is closed. The electromagnetic brake also includes anchor means rotatably mounted in a frame. Electromagnet means are fixedly secured to at least one of the friction plates, the electromagnet means being arranged in cooperative, spaced relation to the anchor means. When current is supplied to the electromagnet means, the electromagnet means moves toward the anchor means so as to release the friction surfaces from the brake wheel. The electromagnet brake also includes means for compensating for any attendant wear of the friction surfaces, thereby maintaining a substantially constant, predetermined clearance between the electromagnet means and the anchor means when the electromagnetic brake is closed. Furthermore, the compensating means includes thread means for allowing the anchor means to advance toward the electromagnet means when the anchor means is rotated in a predetermined direction. Rotating means are provided for effecting the above described rotation. Stopping means are also provided for stopping the advance of the anchor means when the distance between the electromagnet means and the anchor means is substantially equal to the above mentioned, predetermined clearance.

The invention achieves a brake with a substantially constant air gap, which means that a smaller brake electromagnet can be used. Moreover, the brake permits the presence of a large number of tolerances, and the working clearance can be adjusted by the stopping means, for example, spring loaded pins. The adjustment is even and simple, and remains functional through at least the range of motion required to accommodate wear of the friction surfaces.

BRIEF DESCRIPTION OF THE DRAWINGS

In the following, the invention is described in detail by the aid of examples referring to the attached drawings, in which:

FIGS. 9a and 9b respectively illustrate face and cross-sectional views of the adjustment ring in the brake according to the embodiment illustrated in FIG. 6.

DETAILED DESCRIPTION OF THE PREFERRED EMBODIMENTS

Figure 1A:
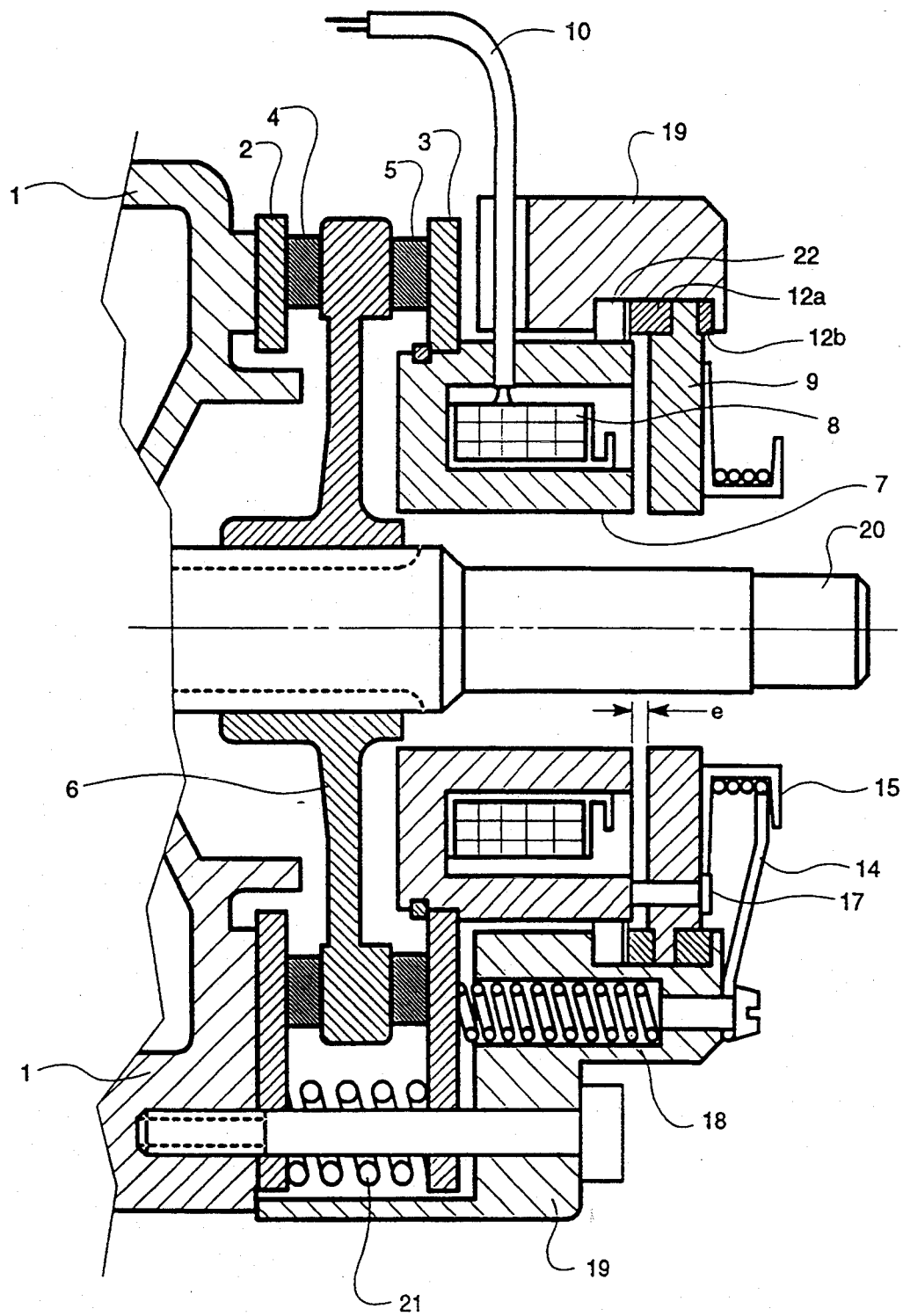
FIGS. 1a–1c illustrate in cross-section a disc brake according to respective first, second and third embodiments of the invention.

FIG. 1a illustrates in cross-section an electromagnetic brake in which the working clearance between the brake and the electromagnet is self-adjusting. This type of brake is typically employed with an electric motor which may be used, for example, as a hoisting motor in a crane. The brake comprises an end shield 1, on which is disposed a first set of friction plates 2. A second set of friction plates 3 is coupled to an electromagnet, which is formed as a substantially U-shaped annular electromagnet housing 7, and a electromagnet winding 8 disposed inside the groove of the housing 7. The electromagnet housing 7 is adapted to the brake housing 19 such that it can move in the axial direction, but is prevented from rotation. The groove of the electromagnet housing 7 is substantially covered by an anchor plate 9, which is rotatably adapted to the brake housing 19. The electromagnet housing 7 and the anchor plate 9 remain separated in the axial direction by a small distance. The friction plates 2 and 3, are provided with respective friction surfaces 4 and 5. Interposed between the friction plates 2 and 3, is a brake wheel 6.

Figures 2A, 2B:
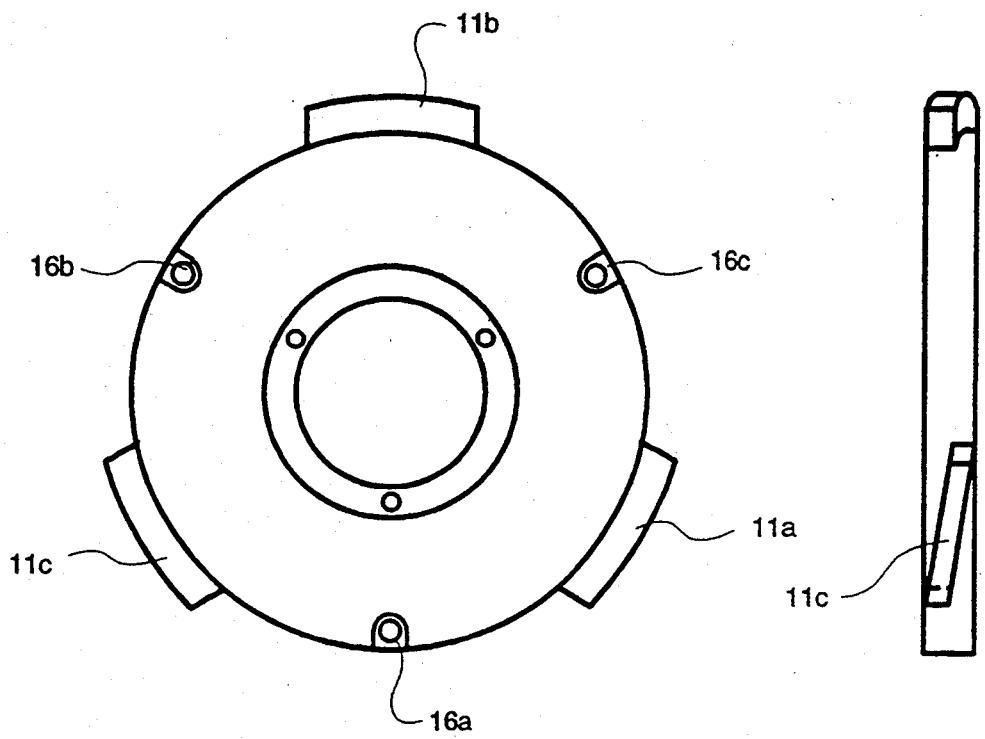
FIGS. 2a and 2b respectively show face and side views of the anchor plate of a disc brake according to the invention.
Figure 3:
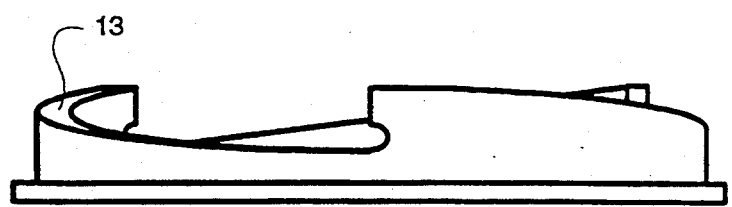
FIG. 3 shows a side view of an adjusting plate of the disc brake according to the invention.

When the electromagnet receives current through the conductor 10, the magnetic force acting between the electromagnet and the anchor plate forces the electromagnet housing 7 and the anchor plate 9 together. The anchor plate is provided with three pitched vanes 11a–11c, as illustrated in FIGS. 2a and 2b, which are rotatably engaged in a flat thread composed of three pitched tracks formed by two identical mating adjustment rings 12a and 12b. The adjustment rings 12a and 12b are fixedly adapted to the brake housing 19, and are each provided with three flat-thread track surfaces 13 as illustrated in FIG. 3.

The anchor plate 9 may be rotated by means of a coiled spring 14 wound about a spring box 15 disposed on, and co-axially to, the anchor plate 9. The anchor plate 9 is provided with holes 16a–16c, as illustrated in FIG. 2a, which accommodate pins 17 loaded by a pretensioned spring (not shown), for example a cup spring. The pins 17 pass through the anchor plate 9, and extend towards the electromagnet housing 7 a distance equalling the working clearance e.

When no current is flowing in the brake electromagnet winding 8, the magnet-friction plate assembly is urged into frictional engagement with the brake wheel 6 by the brake springs 18, which bear against the brake housing 19, and braking action is started. At this instant, there is a certain working clearance between the electromagnet housing 7 and the anchor plate 9. This clearance nominally equals the length of the protruding parts of the pins 17 minus the anchor plate tolerance. As the braking surfaces get thinner due to wear, however, the clearance between the electromagnet housing 7 and anchor plate 9 increases. In response, the coiled spring 14 causes the anchor plate 9 to rotate in its thread tracks, and thereby advance toward the electromagnet housing 7, until the pin ends meet the electromagnet housing 7. Because the force of the coiled spring 14 does not exceed the force of the pin spring pressing the pins out through the anchor plate 9, the adjusting motion of the anchor plate 9 is stopped when the pin ends meet the electromagnet housing 7. Thus the wear of the brake surfaces has been compensated. Note that because the anchor plate advances smoothly as it rotates, the compensation is stepless.

The next time the power to the electromagnet is switched on, an attractive force is generated between the electromagnet and the anchor. Because the anchor plate 9 is in a self-retaining thread, the anchor plate 9 cannot move parallel to the axle 20. The electromagnet housing 7 is moment-locked, and thus cannot rotate, but is adapted to slide coaxially to the axle 20. The force of attraction between the electromagnet housing 7 and the anchor plate 9 exceeds the sum of the force of the brake springs 18 and the pressure of the pins 17, and thus starts moving the electromagnet housing 7 towards the anchor plate 9, pressing in the pins 17 against the force of the cup spring. The clearance between the electromagnet housing 7 and the anchor plate 9 is thereby reduced to nil. The backward movement of the electromagnet housing 7 produces a working gap between the friction plates 2 and 3 and the brake wheel 6, thereby releasing the brake. An auxiliary spring 21 distributes the working gap evenly on either side of the brake wheel.

When the current to the electromagnet winding 8 is cut off, the force of attraction between the electromagnet housing 7 and the anchor plate collapses, and the force of the brake springs 18 suddenly drives the friction plates 2 and 3 into engagement with the brake wheel.

To damp the effects of impacts between the anchor 9 and the electromagnet housing 8, the brake may be provided with a circular spring 22 placed in front of the foremost adjustment ring 12a.

Figure 1B:
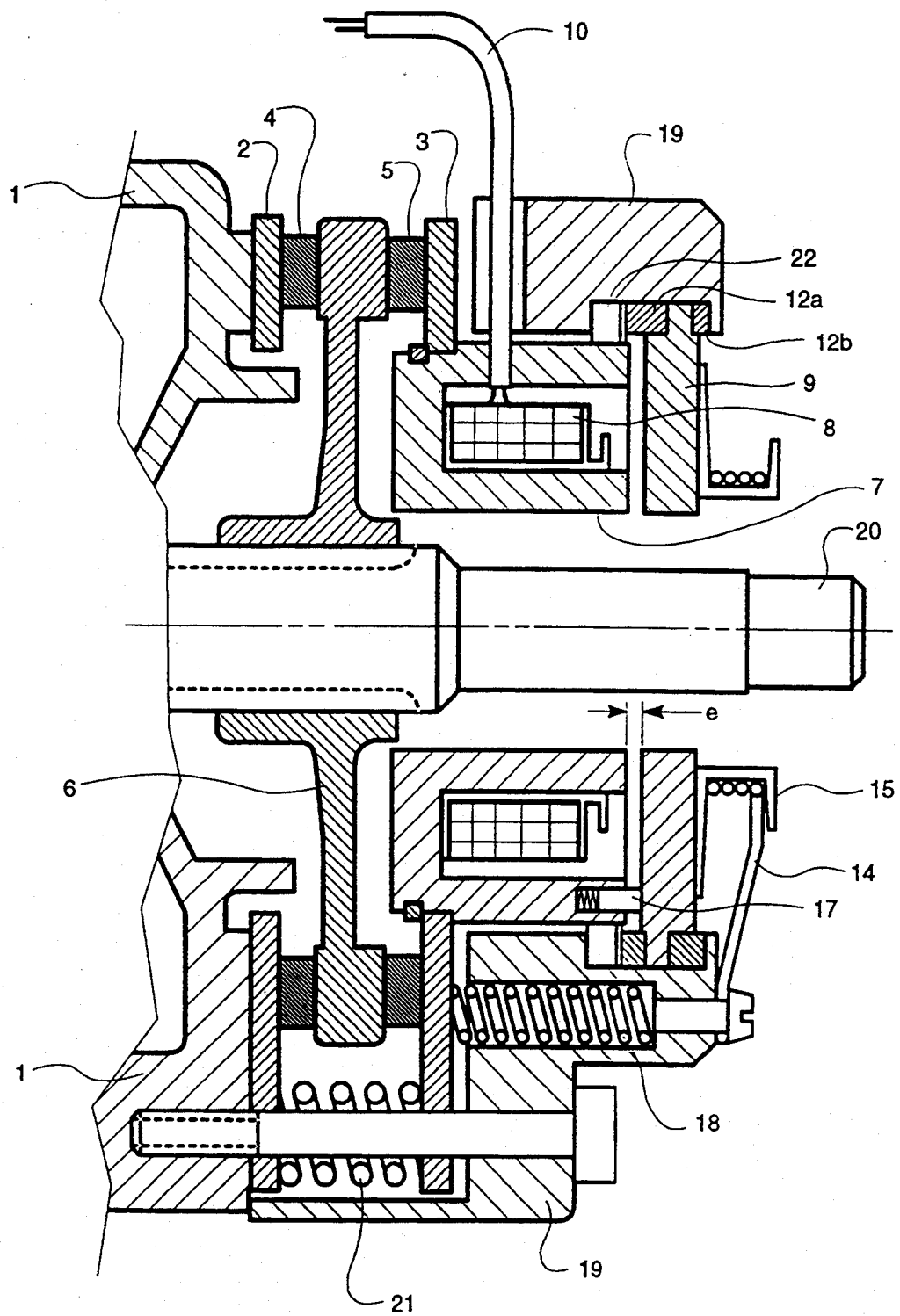

In an alternative arrangement, instead of placing the pins 17 in the anchor plate 9, the pins, along with accompanying springs, can be placed in the electromagnet housing 7 and adapted to bear against the anchor plate 9 (See FIG. 1b).

Figure 1C:
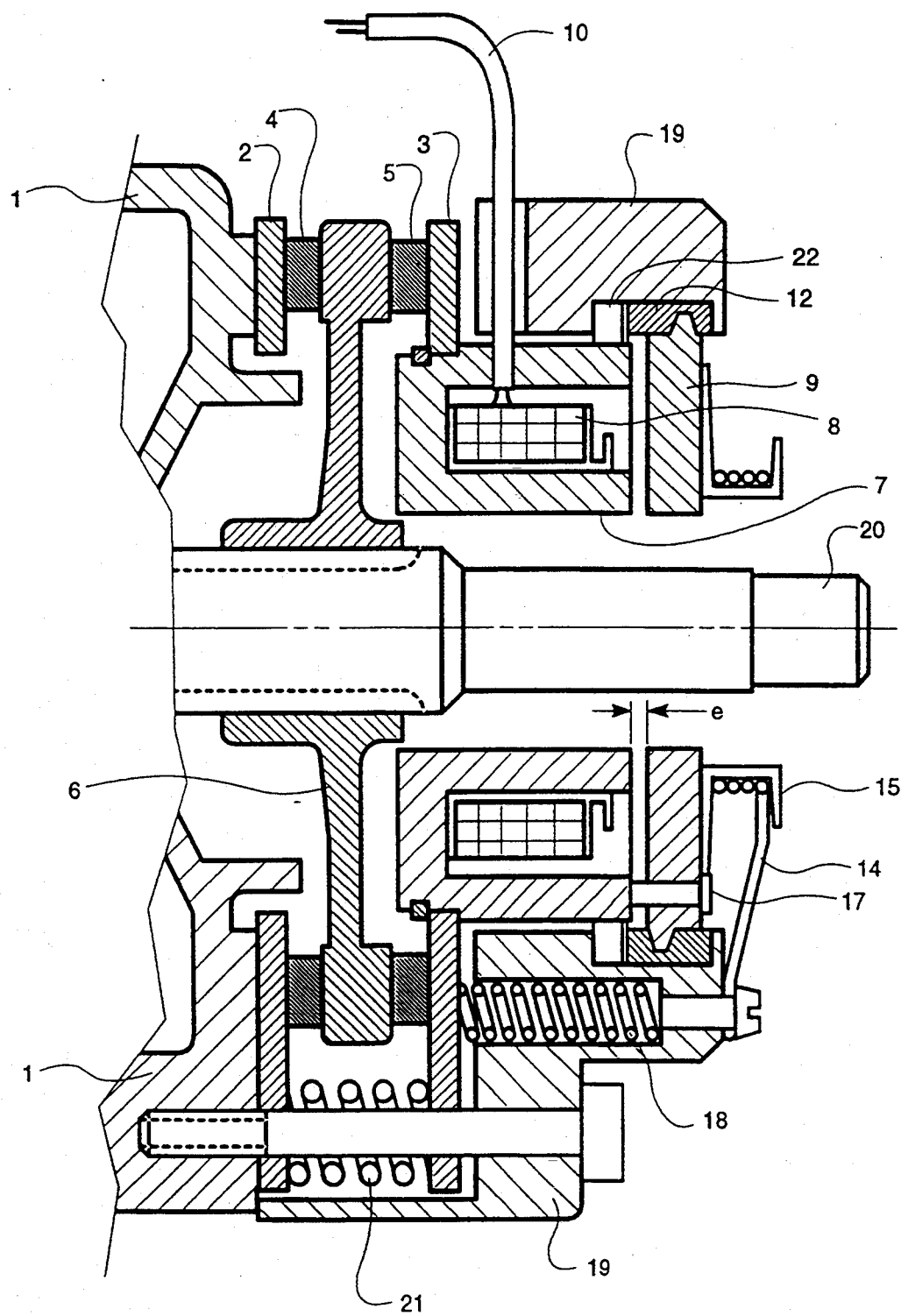

In a further alternative illustrated in FIG. 1c, the anchor plate 9 may be provided with an external thread instead of the pitched vanes 11a–11b, and placed inside an internally threaded adjustment ring 12 instead of the mating adjustment rings 12a and 12b, so that the anchor plate 9 may turn inside the adjustment ring 12 according to the degree of wear of the friction plates 2 and 3 in a manner similar to that described above.

Figure 4:
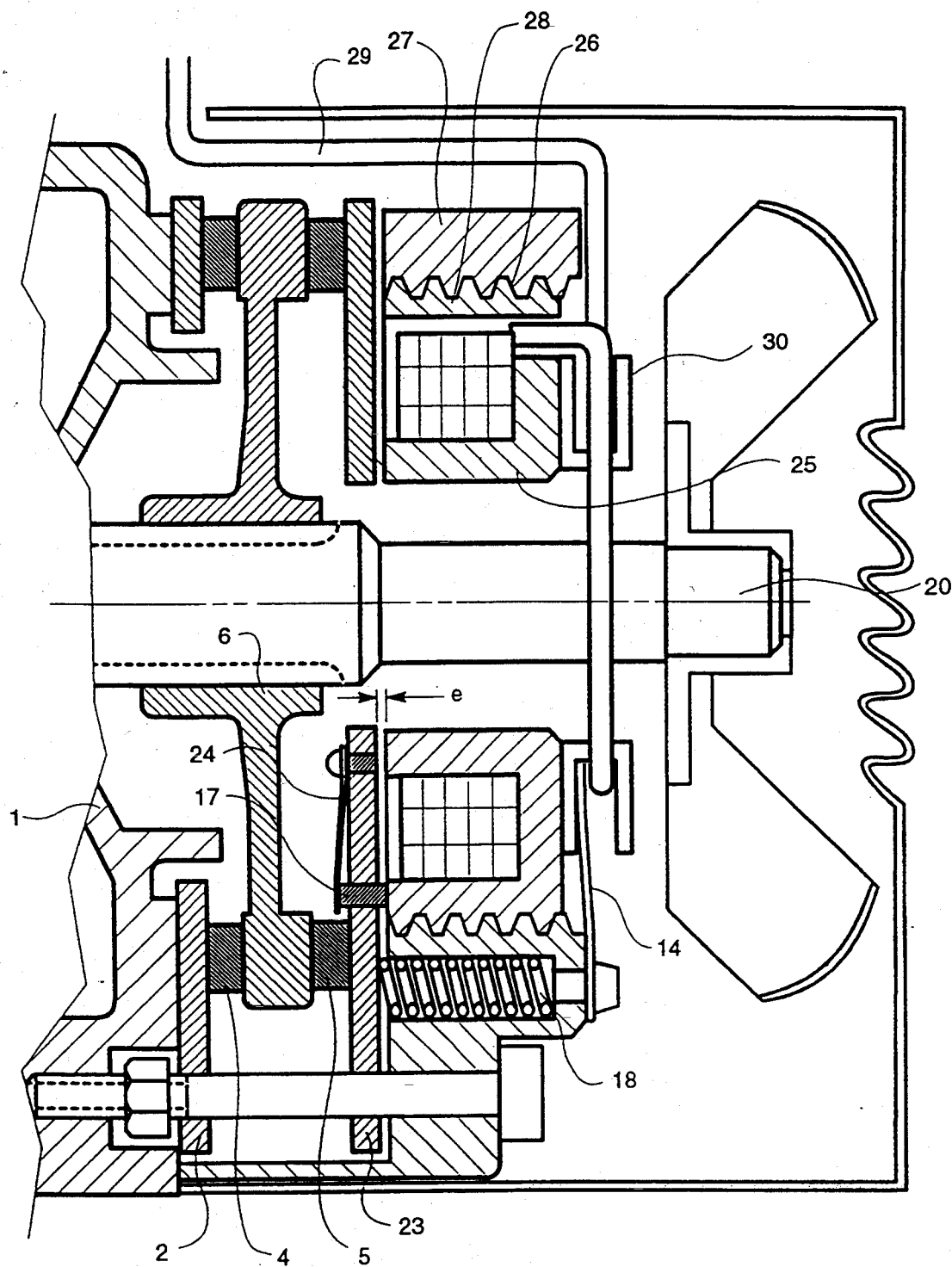
FIG. 4 illustrates in cross section a disc brake according to a fourth embodiment of the invention.

In the embodiment illustrated in FIG. 4, one of the friction plates 23 also serves as an anchor plate, with spring elements 24 pressing the pins 17 against the electromagnet housing 25. In this case, the groove of the electromagnet housing 25 points towards the motor. The electromagnet housing 25 is provided with an external thread 26, which engages with the internal thread 28 of an adjustment ring 27 adapted to the brake housing 19. The conductor 29 passes round the axle 20 inside a protective shield 30.

In this embodiment, the friction plate 23 is adapted to slide co-axially with the shaft 20, but is prevented from rotation. The electromagnet housing 25 may be urged to rotate by the spring 14 and thereby advance the electromagnet housing 25 toward the friction plate 23 until the pins 17 meet the electromagnet housing 25. When power is supplied to the electromagnet winding 8, the friction plate 23 is urged backwards, depressing the pins 17, opening a gap between the friction plates 2 and 23 and the brake wheel 6, and thereby releasing the brake. When the power supply to the electromagnet winding 8 is cut off, the brake springs 18 urge the friction plates 2 and 23 into frictional engagement with the brake wheel 6, and braking action begins.

Figure 5:
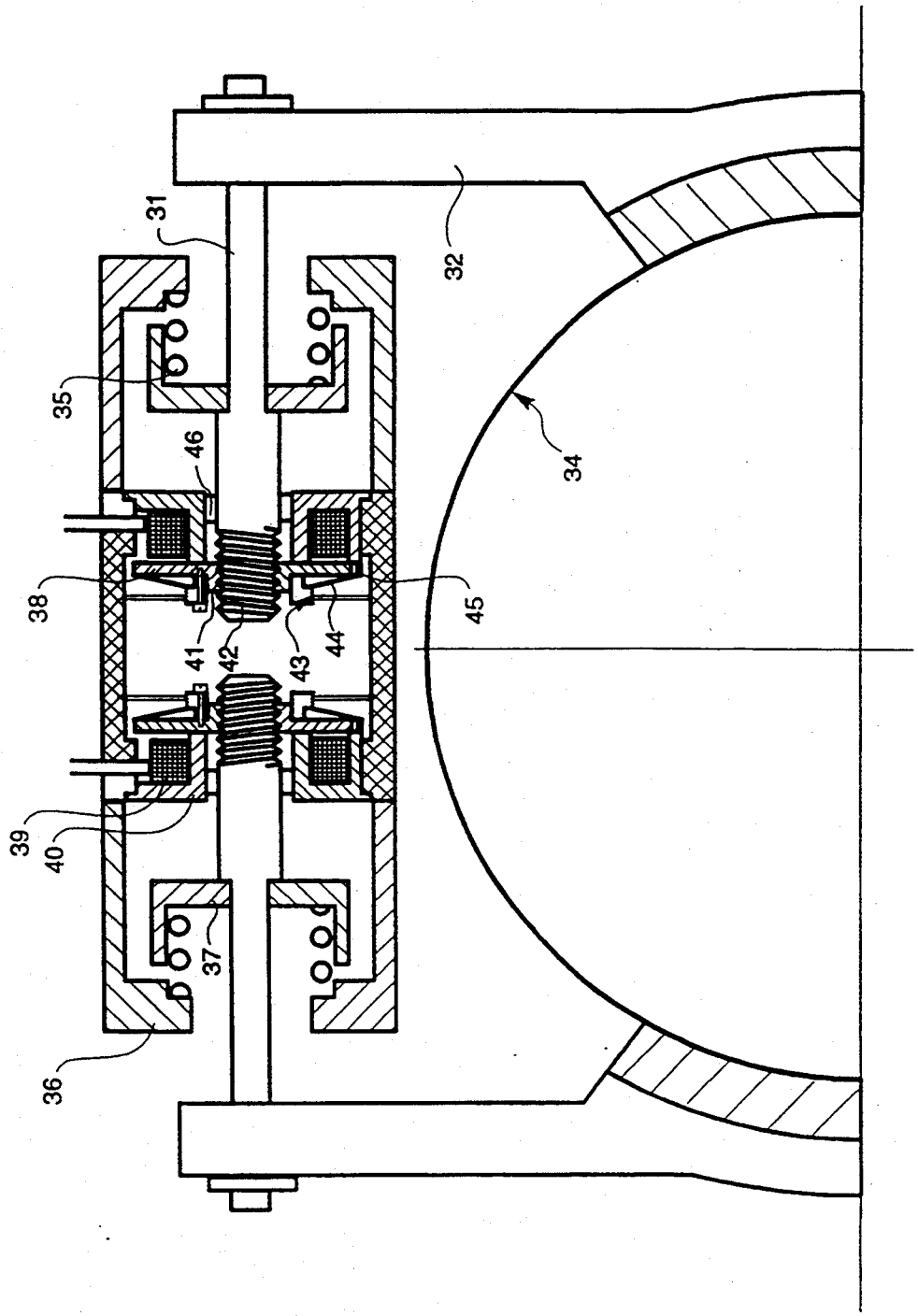
FIG. 5 illustrates a portion of a drum brake according to a fifth embodiment of the invention.

FIG. 5 illustrates an automatically adjusted drum brake according to a third embodiment of the invention. The brake is provided with brake arms 32 actuated by push/pull rods 31. The ends of the brake arms are provided with brake linings 33 which engage the brake drum 34 during braking. Brake springs 35 disposed between the frame 36 and stoppers 37 apply a tensile force to the push/pull rods 31, and thereby urge the brake linings 33 into frictional engagement with the brake drum 34. As the brake linings 33 wear, the width of the air gap between the anchor 38 and the electromagnet housing 40 tends to increase due to the reduction of the thickness of the brake linings 33. The anchor 38 is rotatably connected to the ends of the push/pull rods 31 by threads 41 and 42, and urged to rotate with respect to the push/pull rods 31 by respective coiled springs 43. The anchor plates 38 are fitted with holes through which are movably disposed pins 45 which are urged through the anchor plates 38 towards the electromagnet housings 40 by cup springs 44. When the power to the electromagnet windings 39 is disconnected, the coiled springs 43 cause the anchors 38 to rotate on the threads 42 of the push/pull rods until the spring-loaded (cup springs 44) pins 45 meet the electromagnet surface.

Guide bushings 46 ensure that the anchor faces are always aligned in a direction sufficiently close to parallel with the corresponding electromagnet surfaces. The adjusting threads 41, 42 must be self-retaining. Note that, as can be seen in FIG. 5, the two halves of the drum brake are symmetrical.

Figure 6:
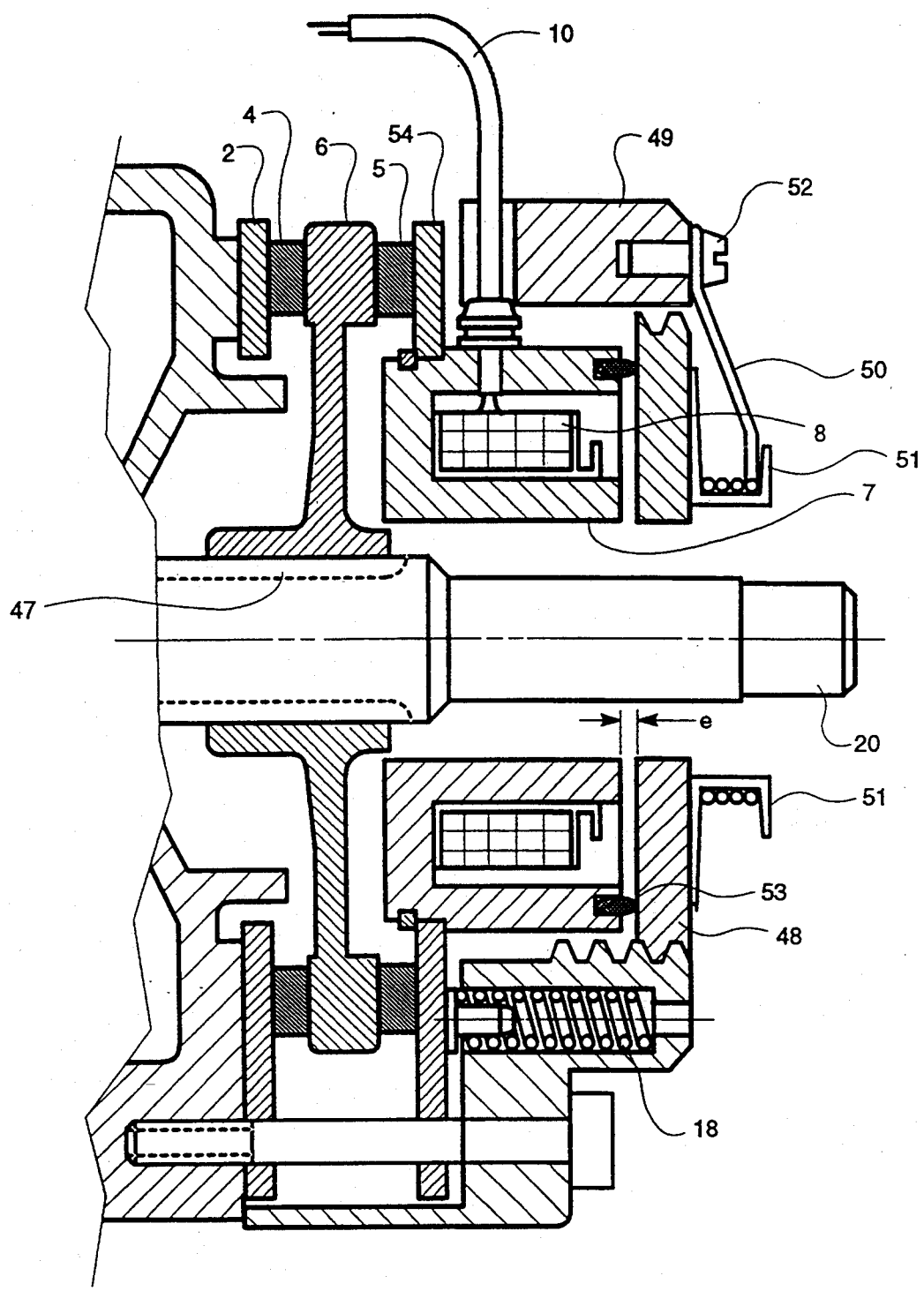
FIG. 6 illustrates a cross-section of a disc brake according to a sixth embodiment of the invention.
Figure 7A:
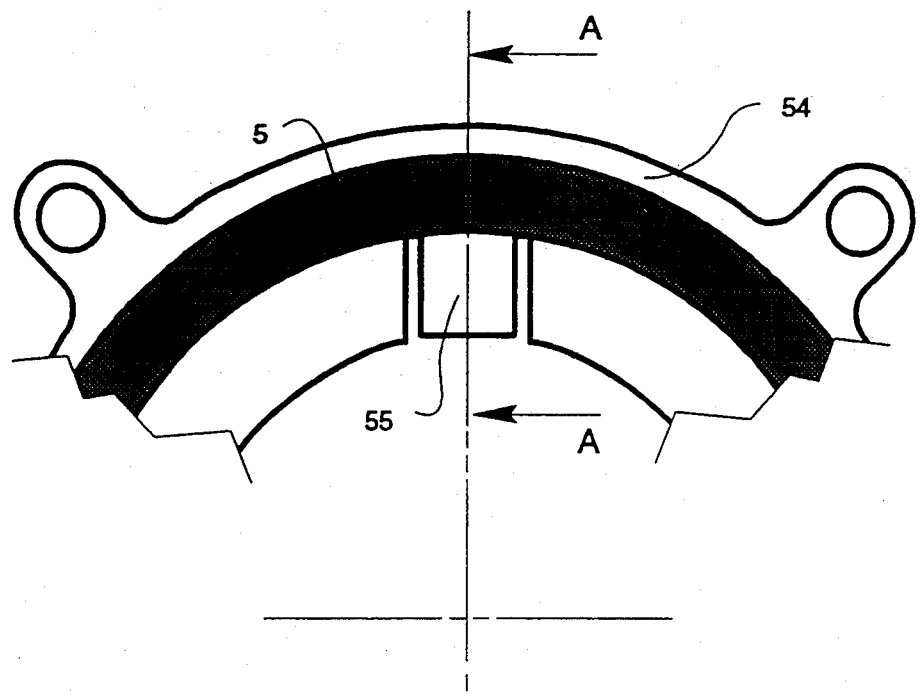
FIGS. 7a and 7b respectively show face and cross-sectional views of the adjusting lugs on the friction plates of the embodiment illustrated in FIG. 6.
Figure 7B:
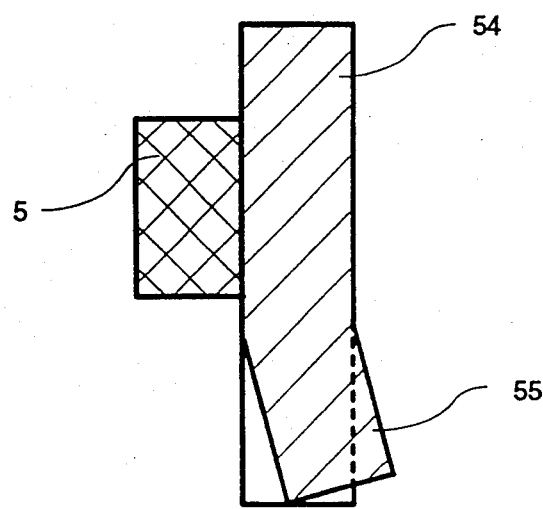
Figure 8B:
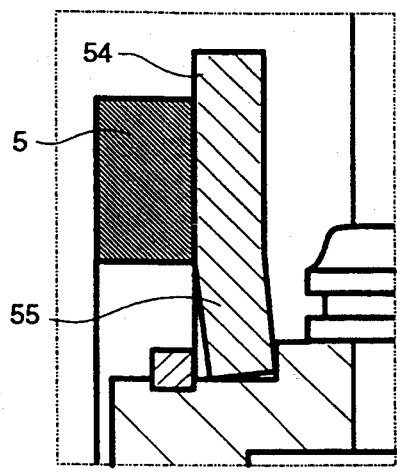
FIGS. 8a–8c illustrate, in cross-section, adjustment of the alignment of the friction plate in the brake according to the embodiment illustrated in FIG. 6.
Figure 8A:
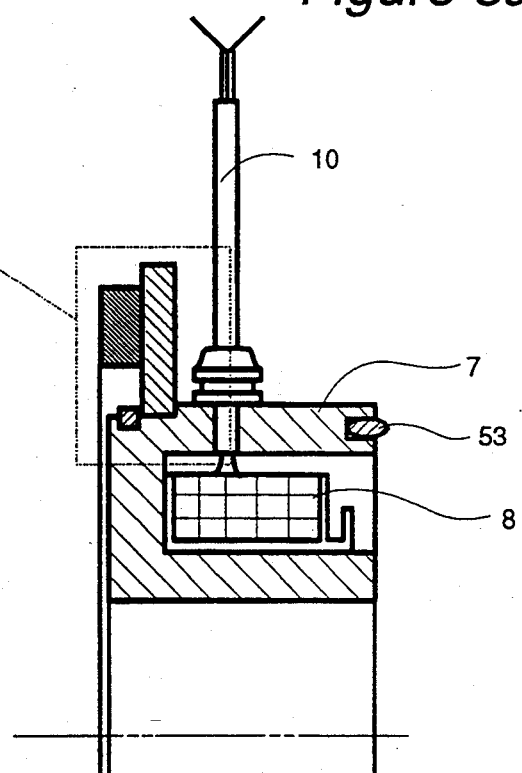
Figure 8C:
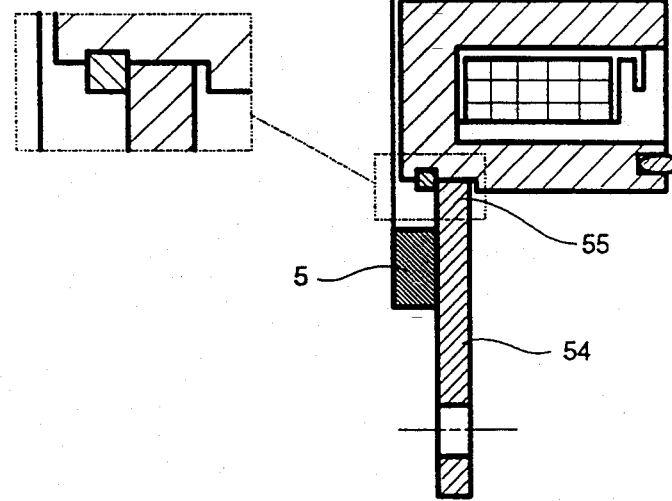

FIG. 6 illustrates in cross-section a disc brake according to a fourth embodiment of the invention. When power to the electromagnet winding 8 is cut off, the brake springs 18 press the friction plate 54/electromagnet assembly against the brake wheel 6. The brake wheel 6 is supported on the shaft 20 by splines 47 which enable the brake wheel 6 to move axially, thus allowing the brake wheel 6 to be pressed against both friction plates 2 and 54 evenly during braking.

As a result of wear during braking, the friction surfaces 4 and 5 are worn down, and consequently the clearance between the electromagnet housing 8 and the anchor 54 increases. If no compensation for the wear is provided, the clearance will eventually become too large for the magnetic attraction to release the brake.

In this embodiment, the outer surface of the anchor 48 is provided with a thread which engages a corresponding thread provided in the brake housing 49. Therefore, the anchor 48 is able to rotate, and therefore advance, in the thread of the brake housing 49. To rotate the anchor 48, the brake is provided with a coiled spring 50 accommodated in a separate spring box 51 provided on the end face of the anchor 48. The spring box 51 protects the spring against entanglement and accidental unwinding as well as against hitting other parts of the brake. The outer end of the coiled spring 50 can be fastened with a screw 52, at a selectable location, to the brake housing 49. For this purpose, the brake housing 49 is provided with holes or cut-outs disposed at a constant radius from the axis of the motor axle, and angularly separated by 15°.

As the clearance between the electromagnet housing 7 and the anchor 48 gradually increases due to wear, the coiled spring 50 rotates the anchor 48 until the latter touches an elastic O-ring 53 accommodated in a groove disposed in the face of the electromagnet housing 7.

The O-ring 53 is mounted so that it protrudes beyond the surface of the electromagnet housing 7 by a predetermined distance. When the anchor 48 touches the O-ring 53, the high frictional force generated between the rubber O-ring 53 and the steel anchor 48 prevents further rotation (and therefore advancement) of the anchor 48.

Due to the resiliency and high frictional co-efficient of the O-ring 53, the problem of over-compensation is reduced. Over-compensation results when repeated impacts between the adjusting threads on the anchor 48 (or the electromagnet housing 7) and the brake housing 49 (or the adjustment ring 12a–12b) causes undesired rotation (and therefore advance) in the adjustment threads. This impact-induced advancement has the effect of over-compensating for the wear of the friction surfaces 4 and 5. In the extreme, this over-compensation may reduce the working clearance to nil, thereby rendering the brake inoperative by preventing the electromagnet 7 and 8 from releasing the brake.

When an electric current is supplied to the electromagnet winding 8, a magnetic attraction is set up between the electromagnet and the anchor 48. The attraction first eliminates the axial clearance between the threads on the anchor 48 and brake housing 49. Then the electromagnet housing 7/ friction plate 54 assembly is pulled back towards the anchor 48 as the O-ring 53 is compressed. Thus, the width of the clearance in which the brake wheel 6 rotates equals the O-ring 53 protrusion minus the axial clearance between the threads.

Since the attractive force of the brake electromagnet increases as the working clearance is reduced, it is advantageous to make the working clearance as narrow as possible. This allows minimization of the electromagnet size and the associated costs. However, the use of a minimal working clearance requires a high degree of control over the working clearance of the brake wheel 6 to ensure that the working clearance will not become too narrow. This high degree of control requires that the working clearance should not be greatly reduced due to clearances and manufacturing tolerances in other components of the brake.

In this embodiment, the joint between the electromagnet housing 7 and one of the friction plates 54 has no play. This is achieved by "calibrating" the thickness of the friction plate 54. The calibration is implemented by bending small collets 55 (FIGS. 7 and 8a–8c) outwards from the plane of the plate. Calibration is necessary because the thickness of standard steel plate varies too much to permit adequate control over the width of working clearance, and proper alignment of the friction plate with the brake wheel. For example, in the case of 4 mm hot rolled steel plate, the allowed thickness variation is $+0.6$ mm and $-0.4$ mm (DIN 1543).

Without calibration of plate thickness, the axial space for the friction plate 54 on the outer surface of the electromagnet housing 7 should be determined according to the largest permitted plate thickness. In the worst case, this would lead to an additional axial clearance as large as 1 mm (in the case of minimum allowed plate thickness).

Referring to FIGS. 9a and 9b, the brake housing adjusting thread which engages the anchor adjusting thread is not continuous but is divided into four sections 56a–56d. Regardless of the motor position, the midpoints of these sections are always at an angle of 45° relative to the horizontal and vertical axes. This arrangement allows the dust and dirt accumulated in the threads to fall down from the thread. Thus the threads in the brake housing 49 are self-cleaning. The self-cleaning effect is promoted by the axial anchor motion which occurs each time power to the electromagnet is switched on or off.

The brake housing 49 is also provided with a cut-out for the brake electromagnet supply cable. This cut-out accommodates a cable seal which, besides sealing the cable, also prevents the electromagnet winding 8 from rotating. Prevention of rotation of the electromagnet winding 8 is necessary to ensure correct operation of the adjustment mechanism and to protect the cable against damage by attrition. These various holes and cut-outs in the electromagnet housing 7 described above also allow auxiliary equipment and attachments to be fastened thereto without extra machining.

The brake housing 49 is also provided with lugs (not illustrated) which:

position the brake housing 49 in the axial direction;

permit moment-locking of the brake parts by means of screws; and protect the friction plate lugs against impacts.

Furthermore, as shown in FIG. 9b, the brake housing 49 comprises sleeves 57 placed inside the brake springs 18 and provided with an internal thread. By inserting threaded bolts 58 through corresponding holes in the brake housing and screwing them into the sleeves 57, the brake springs 18 can be prevented from being released when the brake is dismantled, for example in connection with maintenance operations.

Instead of using an O-ring 53, a variety of other shapes may be employed. For example, the O-ring may be replaced by a plurality of bands composed of a material with elastic properties similar to that of the O-rings. Similarly, short bars, pins, or balls accommodated in appropriately shaped cut-outs disposed on the face of the electromagnet housing 7 may also be used without adversely affecting the operation of the brake or adjustment system.

In addition, in the above description, the O-ring 53 (or other elastic members as described above) has been described as being accommodated on the face of the electromagnet housing 7. However, it may also be operatively accommodated on the face of the anchor 48.

Thus it will be apparent to a person skilled in the art that different embodiments of the invention are not restricted to the examples described above, but that they may instead be varied within the scope of the following claims.

I claim:

1. An electromagnetic brake having a brake wheel disposed on a shaft, and friction surfaces fixedly disposed on respective friction plates, said friction plates being forced by urging means into frictional engagement with said brake wheel when said electromagnetic brake is in an engaged condition, said electromagnetic brake comprising:

anchor means rotatably mounted in a substantially fixed frame of said electromagnetic brake;

electromagnet means fixedly attached to at least one of said friction plates, said electromagnet means disposed in cooperative spaced relation to said anchor means whereby said electromagnet means moves toward said anchor means so as to disengage said friction surfaces from the brake wheel when a current is supplied to said electromagnet means; and compensating means for compensating for wear of said friction surfaces and thereby maintaining a substantially constant predetermined clearance between said electromagnet means and said anchor means when the electromagnetic brake is in the engaged condition, said compensating means comprising thread means fixedly disposed on said brake frame and being adapted to permit said anchor means to advance toward said electromagnet means when said anchor means is rotated in a predetermined direction in said thread means, rotating means for urging rotation of said anchor means in said predetermined direction, and stopping means for stopping the rotation of said anchor means in said thread means when the distance between said electromagnet means and said anchor means is substantially equal to said predetermined clearance;

said thread means comprising a pair of substantially identical adjustment rings substantially fixedly mounted to said brake frame in cooperative mating relation, so as to form a thread track; and said anchor means includes at least two pitched vanes disposed on a peripheral surface of said anchor means for operative sliding engagement with said thread track.

2. A brake as claimed in claim 1, wherein said stopping means comprises at least one spring loaded pin operatively disposed in said electromagnet means and protruding a predetermined distance towards said anchor means, a friction force between said pin and said anchor means being sufficient to prevent further rotation and advance of said anchor means in said thread means.

3. A brake as claimed in claim 1, wherein said stopping means comprises at least one pin operatively disposed through said anchor means and protruding a predetermined distance towards said electromagnet means a friction force between said pin and said electromagnet means being sufficient to prevent further rotation and advance of said anchor means in said thread means.

4. An electromagnetic brake having a brake wheel disposed on a shaft, and friction surfaces fixedly disposed on respective friction plates, said friction plates being forced by urging means into frictional engagement with said brake wheel when said electromagnetic brake is in an engaged condition, said electromagnetic brake comprising:

anchor means rotatably mounted in a substantially fixed frame of said electromagnetic brake;

electromagnet means fixedly attached to at least one of said friction plates, said electromagnet means disposed in cooperative spaced relation to said anchor means whereby said electromagnet means moves toward said anchor means so as to disengage said friction surfaces from the brake wheel when a current is supplied to said electromagnet means; and compensating means for compensating for wear of said friction surfaces and thereby maintaining a substantially constant predetermined clearance between said electromagnet means and said anchor means when the electromagnetic brake is in the engaged condition, said compensating means comprising thread means fixedly disposed on said brake frame and being adapted to permit said anchor means to advance toward said electromagnet means when said anchor means is rotated in a predetermined direction in said thread means, rotating means for urging rotation of said anchor means in said predetermined direction, and stopping means for stopping the rotation of said anchor means in said thread means when the distance between said electromagnet means and said anchor means is substantially equal to said predetermined clearance;

said thread means comprising an adjustment ring substantially fixedly attached to the brake frame, an inner surface of said ring being provided with a thread operatively engagable with a matching thread disposed on a peripheral surface of said anchor means.

5. A brake as claimed in claim 4, wherein said stopping means comprises at least one spring loaded pin operatively disposed in said electromagnet means and protruding a predetermined distance towards said anchor means, a friction force between said pin and said anchor means being sufficient to prevent further rotation and advance of said anchor means in said thread means.

6. A brake as claimed in claim 4, wherein said stopping means comprises at least one pin operatively disposed through said anchor means and protruding a predetermined distance towards said electromagnet means a friction force between said pin and said electromagnet means being sufficient to prevent further rotation and advance of said anchor means in said thread means.

* * * * *